United States Patent [19]

Carrée

[11] 4,008,826
[45] Feb. 22, 1977

[54] PLANTING MACHINE FOR POTATOES AND OTHER TUBERS

[75] Inventor: Francis Carrée, Loudeac, France

[73] Assignee: Societe Jeantil & Cie, Mordelles, France

[22] Filed: Aug. 20, 1975

[21] Appl. No.: 606,226

[30] Foreign Application Priority Data

June 25, 1975 France ............................ 75.19865

[52] U.S. Cl. ............................... 221/13; 221/236; 221/251; 221/253
[51] Int. Cl.² ....................................... A01C 9/02
[58] Field of Search ............ 221/13, 22, 236, 237, 221/204, 205, 251, 253, 254; 111/77, 78

[56] References Cited

UNITED STATES PATENTS

| 925,826 | 6/1909 | McWhorter | 221/253 X |
| 955,193 | 4/1910 | Paulitsch | 221/236 |
| 1,501,335 | 7/1924 | Hartenstein | 221/237 X |
| 1,550,803 | 8/1925 | Harbison | 221/13 |
| 2,589,099 | 3/1952 | Larkin | 221/22 X |
| 3,260,404 | 7/1966 | Critchell | 221/22 X |
| 3,447,707 | 6/1969 | Furst | 221/13 X |
| 3,690,511 | 9/1972 | Wigham | 221/236 X |

*Primary Examiner* — Drayton F. Hoffman
*Assistant Examiner* — Francis J. Bartuska
*Attorney, Agent, or Firm* — Holman & Stern

[57] ABSTRACT

The planting machine comprises a hopper having a bottom formed by a belt conveyor which extends outside the hopper. A tuber supply device supplies the tubers one by one from the conveyor to the furrow to be sown and comprises a collector cup mounted at the end of the conveyor which receives each tuber from the conveyor. A device responsive to the presence of a tuber in the cup stops the conveyor when the tuber is in the cup. Movable cups for taking up the tuber received in the collector cup drive the tuber into the furrow.

14 Claims, 12 Drawing Figures

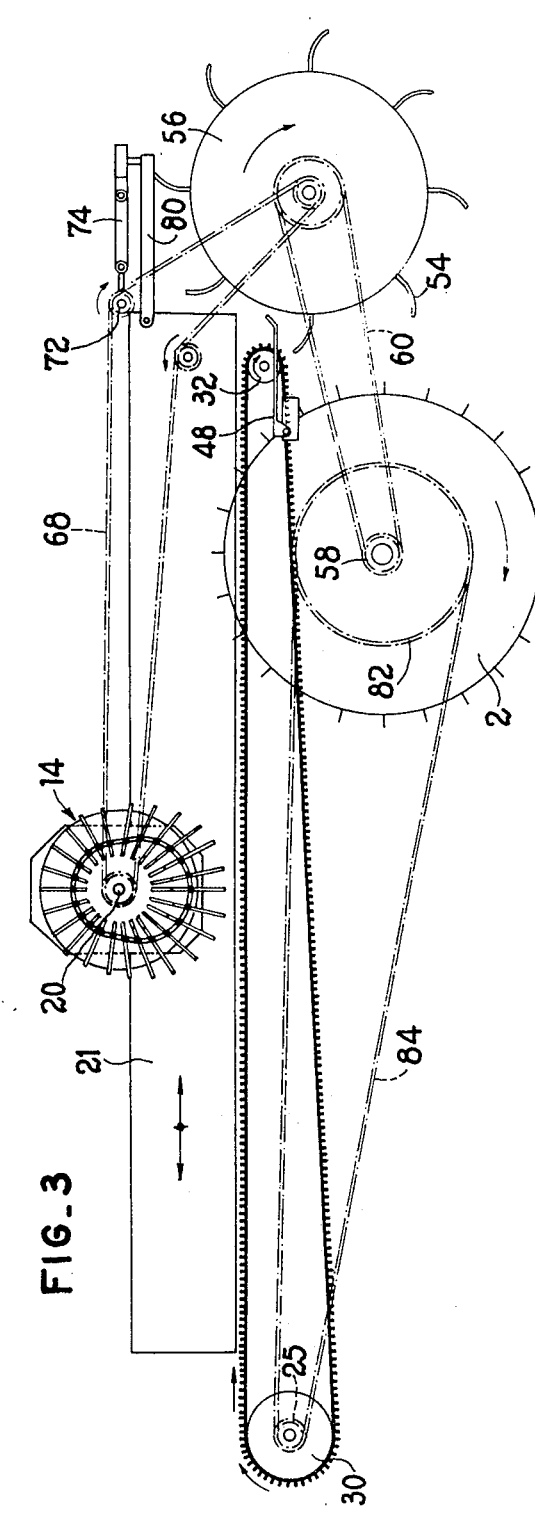
FIG._3
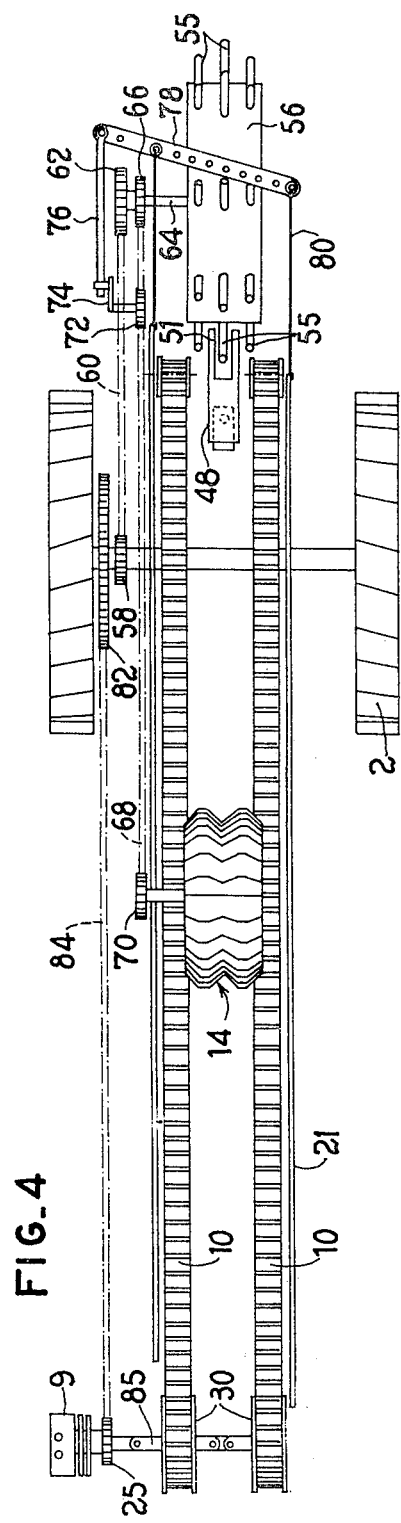
FIG._4

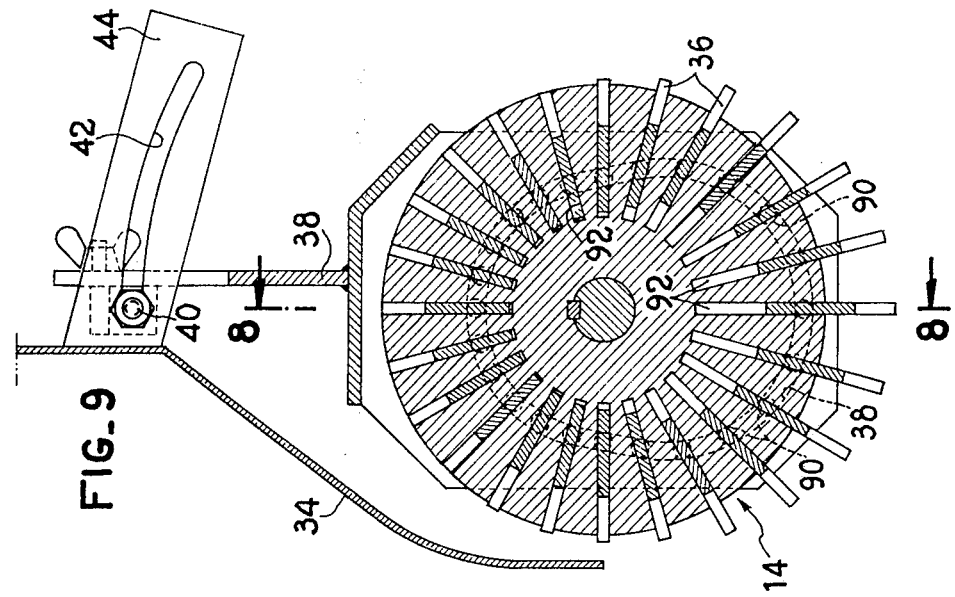
FIG._9
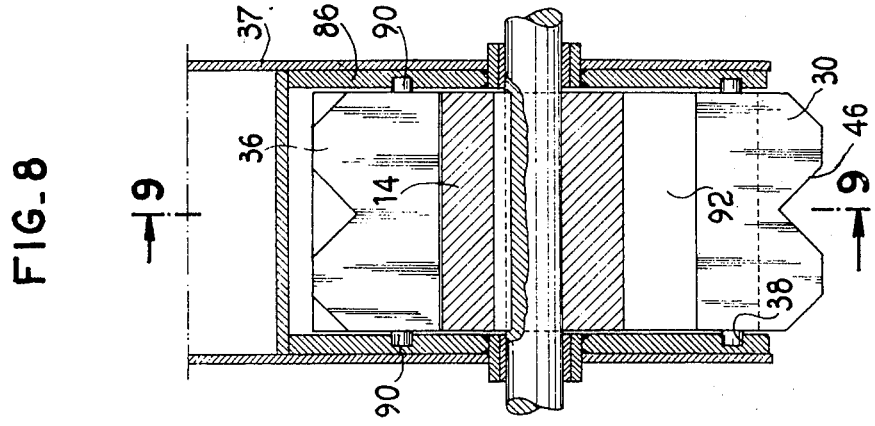
FIG._8

PLANTING MACHINE FOR POTATOES AND OTHER TUBERS

There are presently on the market different types of planting machines for potatoes or other tubers which permit a distribution of well-calibrated tubers one by one in a furrow. Now, it is well known that the potatoes may have very diverse shapes and dimensions and that the potatoes may be planted wholly or in fractions. Moreover, it is often necessary to plant pre-budded tubers which must be moved with care in order to avoid deterioration of the bud.

Planting machines have therefore been proposed which comprise a hopper containing a reserve of tubers to be planted, the bottom of the hopper forming a movable passageway for driving the tubers one after the other to a system for conveying them into the furrow. This system comprises in some cases an ejector which pushes the tuber out of the passageway and in other cases a tongs which seizes it and places it in the furrow.

Such systems act on the tuber irrespective of its size and do not require a calibration. Unfortunately, both exert a force on the tuber and often harm the bud. Moreover, they are driven in a regular manner whereas the spacing of the tubers is difficult to regulate and there results either empty spaces in the furrow or loss of seed.

An object of the present invention is to overcome this drawback and to ensure an even distribution practically without risk of deterioration of the buds.

According to the invention, there is provided a planting machine for potatoes or other tubers of the aforementioned type, wherein the hopper containing the reserve of tubers to be planted forms a movable driving passageway which comprises a collector cup in the form of a fork mounted at the end of the passageway, means for stopping the passageway actuated by the presence of the tuber in the collector cup, and movable forked cups for taking hold of the tuber received in the collector cup and for driving the tuber into the furrow. Means for regulating the displacement of the tubers are mounted above the passageway and driven at the same time as the cups.

According to one embodiment of the invention, the collector cup in the form of a fork is mounted at the end of a pivotable lever controlling a switch for stopping the movable passageway. This collector cup cooperates with forked cups evenly spaced apart on a wheel which rotates at the end of the passageway, said wheel being driven at the same time as the means for regulating the displacement of the tubers and continuously rotating in front of the passageway, even during the stoppage of the latter.

The switch of this cup is sufficiently sensitive to ensure that the passageway is stopped as soon as a tuber, however small it may be, is present in this cup. As soon as the tuber is taken up by the cups of the wheel, the passageway is actuated once again so that the following cup of the wheel once again finds a tuber in the collector cup.

Thus the combination of the collector cup mounted at the end of the passageway with the stopping means avoids substantially any loss of tuber and also prevent the simultaneous planting of two tubers.

Moreover, the shape in the form of a fork of the collector and movable cups permits the passage from one to the other of the cups to occur smoothly with no risk of deterioration of the buds. The distribution is thus extremely regular and all the tubers are planted in turn.

The ensuing description of one embodiment given by way of example and shown in the accompanying drawings will show advantages and features of the invention.

In the drawings:

FIG. 3 and FIG. 4 are respectively a vertical elevational view and a plan view of the system driving the various parts;

FIG. 8 is a detail sectional view taken on line 8—8 of FIG. 9 to an enlarged scale, of a wheel for regulating the displacement of the potatoes;

FIG. 9 is a sectional view taken on line 9—9 of FIG. 8;

Figure 1:
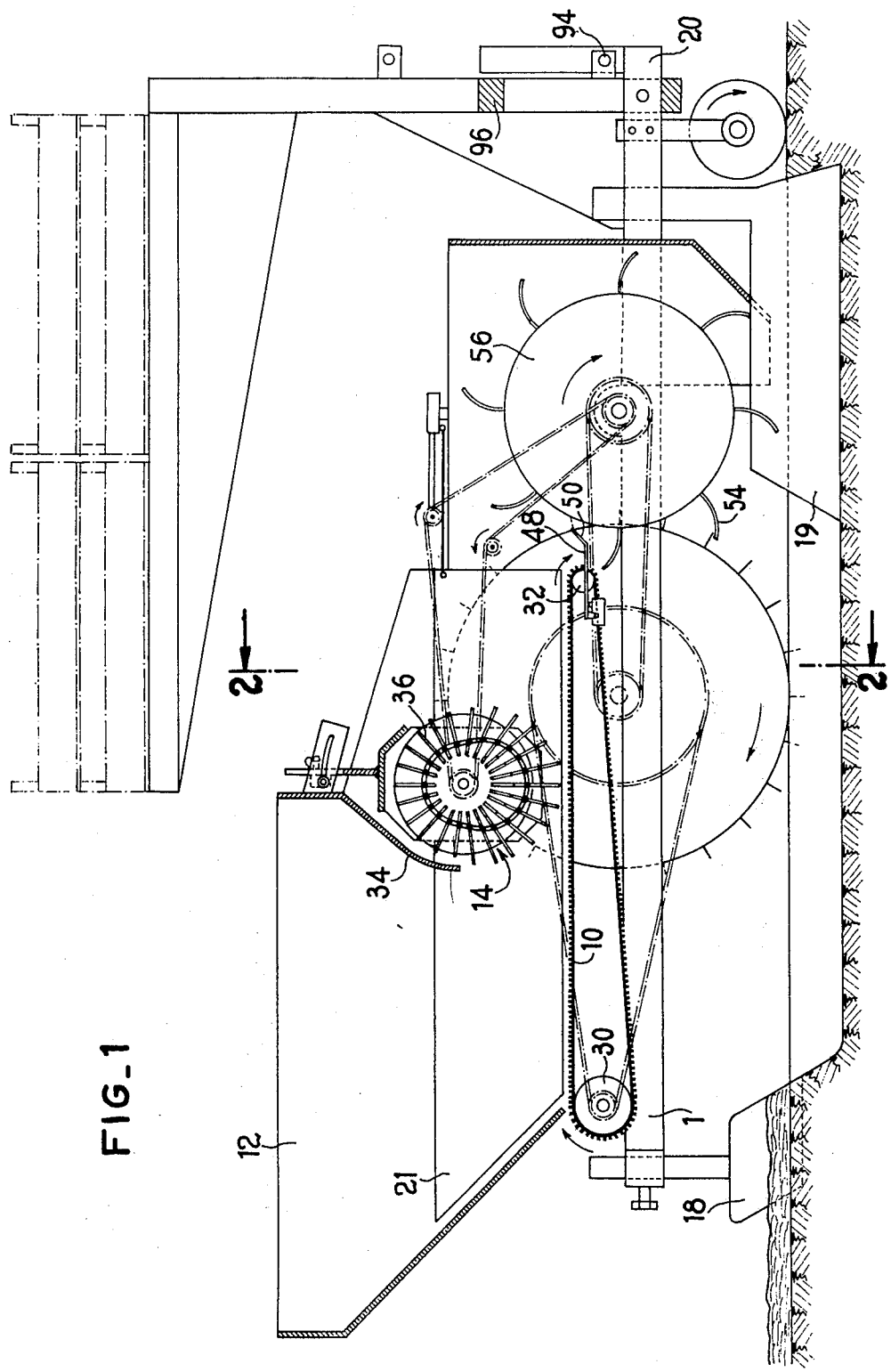
FIG. 1 is a diagrammatic longitudinal sectional view of a planting machine according to the invention.

The planting machine shown in FIG. 1 is supported by a frame 1 provided with two wheels 2 and comprising a coupling system 20 at its front end. In the vicinity of the coupling system 20, the frame supports a V-shaped ploughshare 19 and at its opposite end carries two rakes 18 whereby it is possible to push back the withdrawn earth into the furrow formed by the ploughshare 19 and thus bury the planted tubers.

Figure 2:
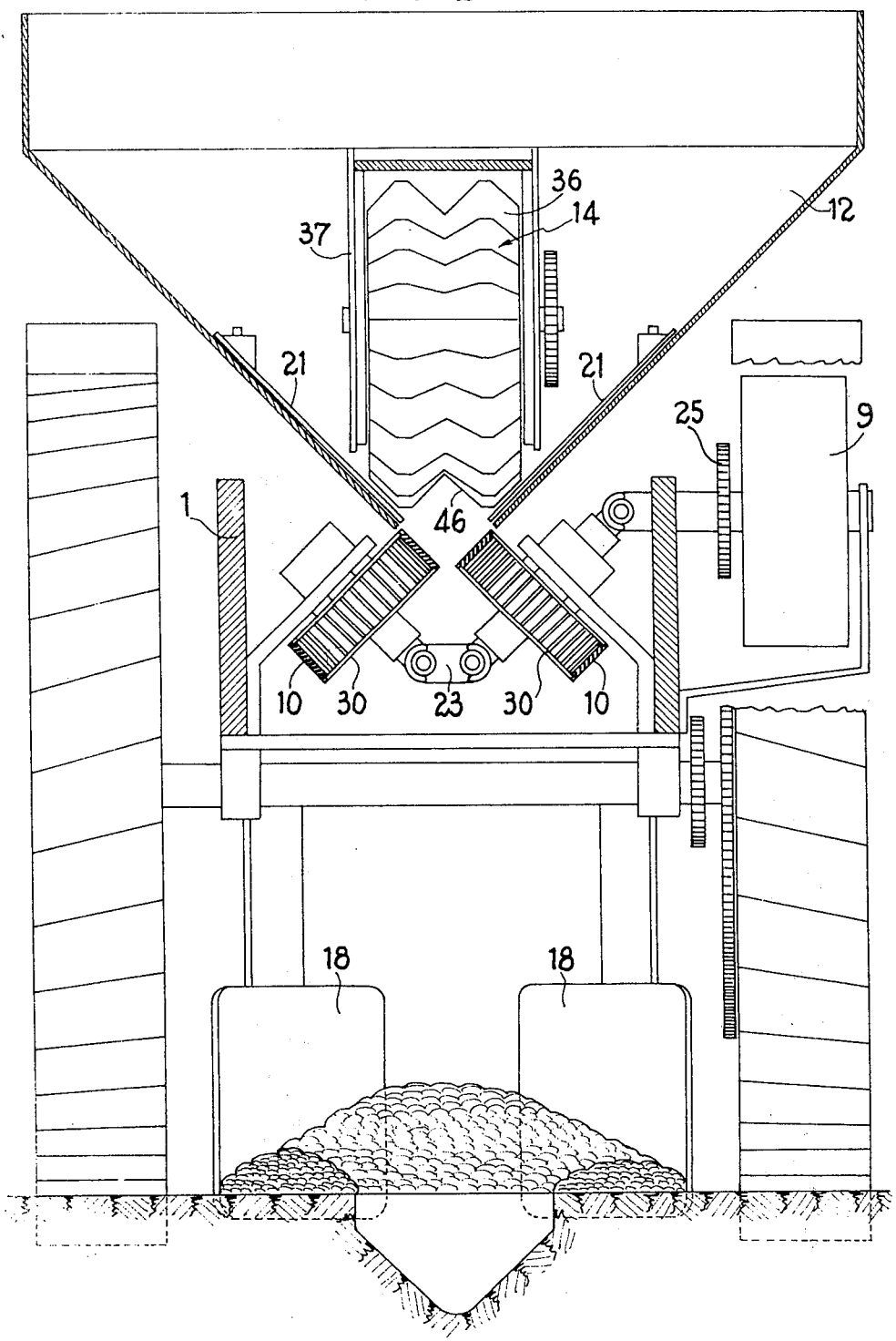
FIG. 2 is a sectional view taken on line 2—2 of FIG. 1.

Mounted above the frame 1 is a hopper 12 adapted to contain the potatoes or other tubers to be planted. The side walls of the hopper are not interconnected in their lower part and the bottom of the hopper is constituted by two endless belts which are inclined with respect to each other at an angle of about 90° and spaced apart a distance less than the normal size of the tubers to be planted. The endless belts 10 each pass around at least two pulleys 30, 32, the pulley 30 being a drive pulley. The two pulleys 30 are interconnected by a universal joint system 23 so that they always rotate simultaneously and at exactly the same speed (FIG. 2). Above this moving bottom constituted by the belts 10 two movable panels 21, parallel to the side walls of the hopper 12, extend throughout the length of this bottom and define therewith a passageway for guiding the tubers. A partition wall 34 is however disposed at the front of the hopper and separates the storing or stockage zone of the tubers from the guiding and driving passageway. This partition wall does not extend down to the movable bottom but allows a passage for the tubers between this bottom and its lower end. Mounted between the partition wall 34 and the end of the passageway is a rotary structure for regulating the displacement of the tubers constituted by a wheel 14 having vanes, suspended from the partition wall 30 and driven in rotation in the opposite direction to the displacement of the movable bottom 10.

The vanes 36 of the wheel 14 may be fixed and have for example a certain flexibility or, on the other hand, they may be retractable and move back progressively into the wheel itself as it rotates. The wheel 14 is mounted between two parallel side walls 37 which are disposed vertically and suspended in their upper part from a plate 38 connected to the wall 34. In practice, the plate 38 is integral with a bolt 40 which extends through a slot 42 formed in a plate 44, the slot 42 having a curved shape and the bolt 40 being capable of occupying any desired position in this slot (FIG. 9).

It will be clear that the displacement of the bolt 40 permits a variation in the height of the wheel 14 with respect to the movable bottom 10. Whether the vanes 36 be movable or fixed, they preferably comprise a V-shaped notch 46 which defines with the belts 10 of the movable bottom a passage which allows exit from the hopper 12 of only a single tuber at a time.

The wheel 14 and the vanes 36 cooperate therefore with the two pannels 21 so as to prevent the advance of tubers in side-by-side relation and to place them one behind the other and even to separate them.

Figure 5:
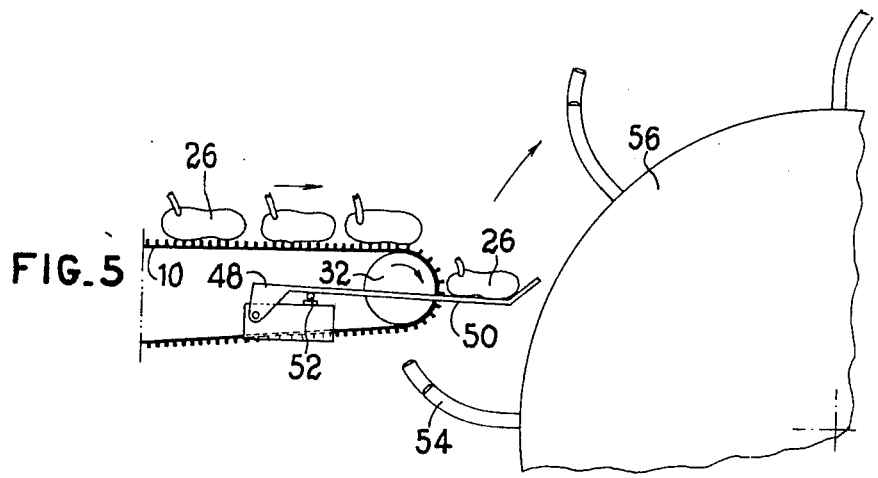
FIGS. 5, 6 and 7 are detail views to an enlarged scale of the collecting and driving cups in three positions, namely a tuber-receiving position, a tuber-seizing position and a tuber-driving position.

At the front end of the passageway formed by the belts 10, the frame 1 supports a pivotable lever 48 whose end outside the movable bottom constitutes a forked cup 50 whereas its opposite end is pivoted to a switch 52. The collector cup 50, preferably constituted by two curved fingers or branches 41 the concavity of which faces upwardly, thus projects from the end of the movable passageway and is ready to receive a tuber 26 when the latter topples over the end of this passageway as shown in FIG. 5. The weight of this tuber 26 on the cup 50 causes the opening of the switch 52 and the stoppage of the movement of the belts 10.

Figure 6:
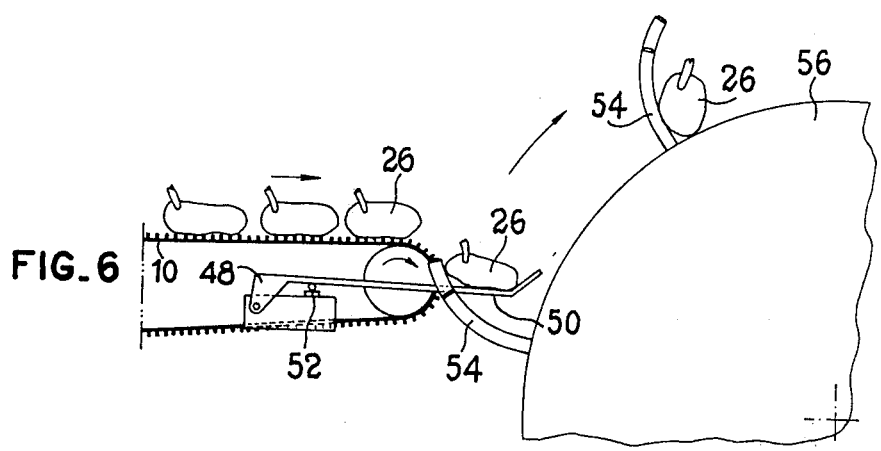
Figure 7:
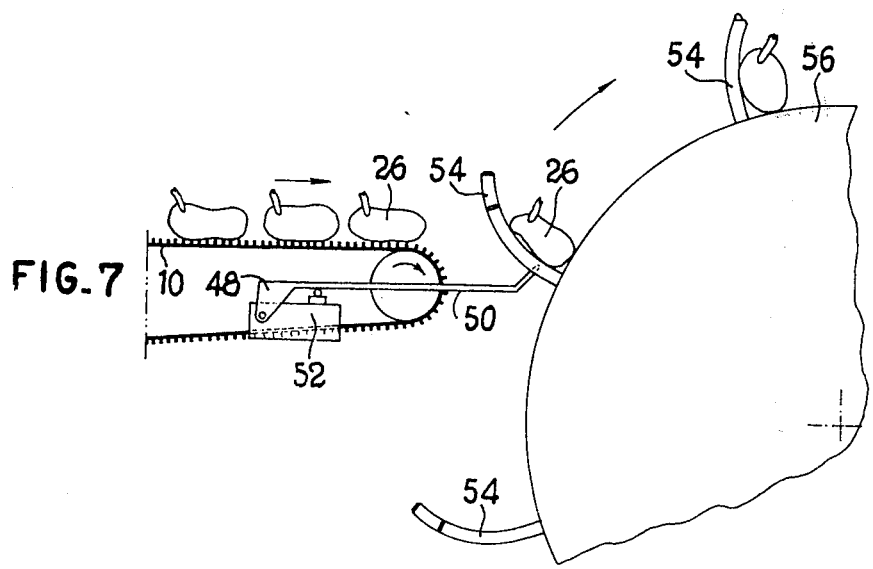

The cup 50 cooperates with other cups 54 which are also provided with fork fingers and are evenly spaced apart on the periphery of a wheel 56 placed in front of the end of the movable passageway. The wheel 56 and cups 54 constitute a tuber distributing means and each one of the cups 54 preferably comprises three curved fingers 55 which are spaced apart from each other in such manner as to be capable of passing between the fingers 51 of the collector cup 50 and thus take up smoothly the tubers 26 placed in this cup so as to drive it along when the wheel 56 rotates (FIGS. 6 and 7). The wheel 56 is placed just above the V-shaped ploughshare 19 and deposits the tubers one by one inside the V-shape of this ploughshare so that it falls into the furrow formed by the latter. As soon as the tuber 26 is taken up by the cup 54, the lever 48 is relieved of the weight of the tuber and the switch 52 is consequently once more closed. The belts 10 of the movable passageway again start to move and bring another tuber 26 into the cup 50.

The wheel 56 is driven in a regular and continuous manner by the wheels 2 of the planting machine. Indeed, as can be seen in the FIGS. 3 and 4, one of the wheels 2 is integral with a sprocket wheel 58 which drives through a chain 60 another sprocket wheel 62 integral with the shaft 64 of the wheel 56. The sprocket wheel 62 is also integral with another sprocket wheel 66 which drives through a chain 68 a sprocket wheel 70 carried by the shaft of the wheel 14 carrying the vanes.

The chain 68 also drives a sprocket wheel 72 which causes, through an eccentric system 74 the displacement in translation of a connecting rod 76 pivoted to a lever 78. Pivoted at two points of this lever 78 are rods 80 which are each fixed to one of the panels 21. The lever 78 is moreover pivotally mounted at an intermediate point between the point of attachment of the two rods 80 so that the displacement of the connecting rod 76 causes the displacement in opposite directions of these rods 80 and consequently of the panels 21. As the tractor which drives the planting machine moves over the ground, the rotation of the wheels 2 causes the rotation of the wheel 56 carrying the cups and at the same time the rotation in the opposite direction of the wheel 14 carrying the vanes and the alternating displacement of the two panels 21 in opposite directions.

The wheel 2 and the sprocket wheel 58 are also integral with a sprocket wheel 82 which drives through a chain 84 a sprocket wheel 25 mounted on the shaft 85 of the pulley 30 by a clutch 9 controlled by the switch 52 of the collector cup 50.

In normal operation, the tubers or potatoes which are placed in the hopper 12 and bear on the movable bottom constituted by the belts 10, are progressively driven by the belts. However, the partition wall 34 allows through only certain thereof. The wheel 14 brakes their displacement and constrains them to separate from each other whereas the lateral friction exerted in opposite directions by the panels 22 aligns them correctly one behind the other. The tubers therefore arrive one by one at the end of the passageway so that only one thereof falls into the cup 50 at a time. The passageway is immediately stopped and remains stationary so long as a cup 54 has not taken up the tuber 26. The arrival of this tuber can therefore occur at any moment of the rotation of the wheel 56. As soon as the cup 50 is empty the belts 10 start to move again and supply another tuber to this cup.

The number of teeth of the sprocket wheel 25 is sufficiently small with respect to the number of teeth of the sprocket wheel 58 so that the displacement of the movable passageway is rapid and the cup 50 is once more filled before the arrival of the following cup 54.

The lever 48 is easily designed in such manner as to tilt even if the tuber has a very small size so that even divided potatoes act on the control of the movable bottom and can be distributed one by one in the same manner as whole potatoes. It will be, moreover, observed that this planting machine permits the distribution of the tubers in an extremely regular manner with a minimum of loss, cups 54 which effect a complete rotation without receiving a tuber being extremely rare. Moreover, all of the movements occur smoothly without shock and without marked friction so that the possible buds of the tubers arrive practically intact in the furrow.

The tubers are covered in the conventional manner with earth by the rakes 18 disposed at the rear of the planting machine.

Although the regulation of the arrival of the tuber by means of a wheel having fixed vanes is good, it has been observed that it is still further improved by the use of a wheel having retractable vanes such as that shown in FIGS. 8 and 9. In this embodiment, the wheel 14 is mounted between two side walls 86 which are provided with a groove 88 which is eccentric with respect to the whole of the wheel. The grooves 88 cooperate with pins 90 which are integral with each of the vanes 36 and extend from both sides of the wheel. Moreover, the wheel itself is provided with radial slots 92 in which the vanes 36 move. The shape of the grooves 88 is such that the vanes are completely retracted within the wheel 14 when they are located in the upper part of the assembly as shown in FIG. 9. On the other hand, the vanes extend out of the wheel, in the direction of the movable bottom 10, so as to have full effect on the tubers displaced by this bottom.

Figure 10:
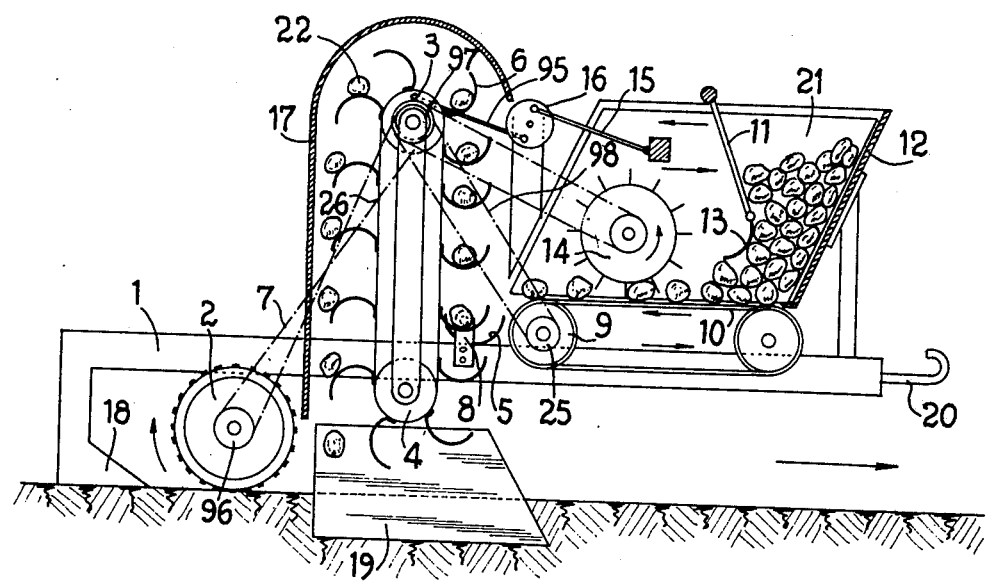
FIG. 10 is a diagrammatic longitudinal sectional view of a modification of the invention.
Figure 11:
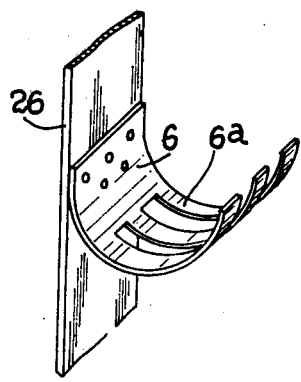
FIG. 11 is a perspective view to an enlarged scale of a movable cup.
Figure 12:
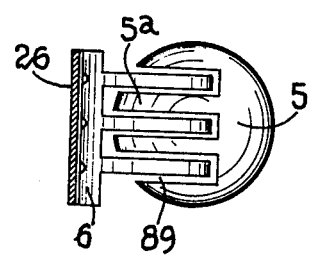
FIG. 12 is a top view of the cup shown in FIG. 11 when it passes through the fixed cup.

FIG. 10 shows a modification in which the hopper 12 disposed in the front part of the planting machine has its output defined, not by a fixed partition wall, but by an adjustable partition wall 11 extended by a flexible flap 13 which ensures a first braking of the tubers so that only those thereof which are directly in contact with the belts 10 leave the hopper.

In front of the free end of the movable passageway 10 the frame 1 supports a fixed cup 5 in the form of a shell provided with slots 89 defining curved fingers or branches 5a whose concavity faces upwardly. Mounted on each side of this cup is a photoelectric cell 8 or like detecting means which is responsive to the presence of a body, that is to say a tuber in the presently-described embodiment, in the cup. This detector is connected to the clutch 9 controlling the movable passageway and causes the stoppage of the latter as soon as a tuber has fallen into the cup 5.

The tuber is taken up by a cup 6 similar to the cup 54. This cup has curved fingers or branches 6a and is mounted on an endless chain 26 which extends round two sprocket wheels 3 and 4 which are disposed vertically above each other above the ploughshare 19. Cups 6 are disposed at regular intervals on the chain 26 and the assembly is placed, in the same way as the wheel 56 shown in FIG. 1, in a housing 17 which retains the tubers in the second part of the travel of the chain. Indeed, the tuber 22 is raised by the fingers of the cup 6, which is driven by the chain 26 up to the level of the wheel 3, but at this moment the cup pivots and turns over so that the tuber falls onto the back of the preceding cup and is retained by the housing 17. In this way it descends down to the level of the ploughshare 19 and drops into the furrow formed by the latter.

As in the embodiment shown in FIG. 1, the chain 26 having cups and the passageway 10 are driven by the wheel 2 of the planting machine (or by an auxiliary motor secured to the chassis) through a chain 7 connecting a sprocket wheel 96 integral with the wheel 2 to a sprocket wheel 97 integral with the sprocket wheel 3 and a second chain 98 connecting the sprocket wheel 97 to a sprocket wheel 25 connected by the clutch 9 to the driving pulleys of the passageway 10.

It will be understood that the lateral walls of the hopper 12 also have panels 21 vibrating in opposite directions. These panels are each integral with a weight carried by the end of connecting rods 15 connected by an eccentric 16 and a second connecting rod 95 to the sprocket wheel 3. The wheel 14, which comprises for example flexible vanes, is also driven by the sprocket wheel 3.

As in the preceding embodiment, the collector cup is always present for receiving the tuber which arrives at the end of the passageway and there is no risk that it receives two tubers so that the losses of seed are practically nil. Inversely, the speed of the passageway can be easily arranged to be sufficiently high to ensure that no cup 6 encounters an empty cup 5. Moreover, the tubers are handled smoothly and without shock.

The planting machine is preferably secured to a tractor or to any other drive means through a coupling 20 which comprises a vertical bar (FIG. 1) extending above a pivot point 94 and capable of abutting a cross-member 96 of a frame integral with the tractor so as to prevent any tilting of the assembling and to automatically re-establish the frame 1 in a horizontal position. The planting machine may thus travel over uneven ground and yet always maintains its efficiency.

The planting machine may of course be employed alone or be fixed to a support chassis which permits disposing a plurality of planting machines in side-by-side relation, whereby a plurality of parallel furrows may be sown simultaneously.

Having now described my invention what I claim as new and desire to secure by Letters Patent is:

1. A planting machine for tubers such as potatoes comprising a hopper for containing tubers to be planted, a movable conveyor which forms a transverse bottom of the hopper and extends outside the hopper and is movable in a given direction, means for driving the conveyor in said given direction, tuber distributing means for receiving the tubers from the conveyor and distributing the tubers one by one to the furrow to be sown, and regulating means for restricting the supply of tubers from the conveyor to the distributing means to solely one tuber at a time, the regulating means comprising a rotary structure mounted above the conveyor and defining with the conveyor a gap which is capable of allowing the passage of only one row of tubers, means for driving the periphery of the rotary structure adjacent the conveyor in a direction opposed to the direction of movement of the conveyor, a fork-shaped collector cup mounted at an end of the conveyor for receiving only one tuber from the conveyor at a time, means responsive to the presence of said one tuber in the cup and operative for stopping the movement of the conveyor when said one tuber is in the cup and allowing the movement of the conveyor when the collector cup is empty, the distributing means comprising movable cups for respectively passing through the fork-shaped collector cup and taking up a tuber received in the collector cup and depositing the tuber into the furrow, and means for driving the movable cups.

2. A planting machine as claimed in claim 1, wherein the collector and movable cups have the shape of forks comprising curved fingers, the fingers of the movable cups being disposed in such manner as to be capable of passing between the fingers of the collector cup so as to take up the tuber.

3. A planting machine as claimed in claim 1, wherein the regulating means comprise two vibratable panels which are respectively parallel to opposed inclined walls of the hopper, and means for driving the panels in opposite directions parallel to the panels.

4. A planting machine as claimed in claim 1, wherein the rotary structure comprises a wheel which has vanes defining said gap with the conveyor, said gap being capable of allowing the passage of only one tuber at a time between the conveyor and the vanes.

5. A planting machine as claimed in claim 4, wherein the vanes of the wheel regulating the displacement of the tubers are flexible.

6. A planting machine as claimed in claim 1, wherein the hopper has inclined walls and, between the inclined walls, a partition wall terminating at a distance from the conveyor and defining above the conveyor an aperture for the passage of the tubers one by one.

7. A planting machine as claimed in claim 6, wherein the partition wall comprises at its lower part a flexible flap for braking the tubers.

8. A planting machine as claimed in claim 1, wherein the collector cup is fixed at the end of the conveyor and at least one photo-electric cell disposed near enough to the collector cup for detecting the presence of the first tuber received in the collector cup is connected to the means for moving the conveyor to stop the movement of the conveyor upon detection of the tuber.

9. A planting machine as claimed in claim 1, wherein the conveyor comprises two endless belts which are inclined with respect to each other transversely of the conveyor and driving sprocket wheels for driving the two belts and means for interconnecting the driving sprocket wheels so that they rotate together.

10. A planting machine as claimed in claim 1, wherein the conveyor has upper tuber-contacting surface means which are driven in a substantially horizontal direction toward the collector cup.

11. A planting machine for tubers such as potatoes comprising a hopper for containing tubers to be planted, a movable conveyor which forms a transverse bottom of the hopper and extends outside the hopper and is movable in a given direction, means for driving the conveyor in said given direction, tuber distributing means for receiving the tubers from the conveyor and distributing the tubers one by one to the furrow to be sown, and regulating means for restricting the supply of tubers from the conveyor to the distributing means to solely one tuber at a time, the regulating means comprising a rotary structure mounted above the conveyor and defining with the conveyor a gap which is capable of allowing the passage of only one row of tubers, means for driving the periphery of the rotary structure adjacent the conveyor in a direction opposed to the direction of movement of the conveyor, a fork-shaped collector cup mounted at an end of the conveyor for receiving only one tuber from the conveyor at a time, means responsive to the presence of said one tuber in the cup and operative for stopping the movement of the conveyor when said one tuber is in the cup and allowing the movement of the conveyor when the collector cup is empty, the distributing means comprising movable cups for respectively passing through the fork-shaped collector cup and taking up a tuber received in the collector cup and depositing the tuber into the furrow, and means for driving the movable cups, said means responsive to the presence of said one tuber comprising a switch for stopping operation of the conveyor, a pivotal lever responsive to the reception of the tuber in the collector cup and combined with the switch for actuating the switch, the collector cup being mounted at a free end of the pivotal lever, the means for driving the rotary structure and the means for driving the movable cups being operative simultaneously and continuously, even during the stoppage of the conveyor.

12. A planting machine as claimed in claim 11, comprising a driving sprocket wheel for driving the conveyor and a clutch mounted between the means for simultaneously driving the movable cups and the rotary structure and the driving sprocket wheel, the switch being combined with the clutch for controlling the clutch.

13. A planting machine for tubers such as potatoes comprising a hopper for containing tubers to be planted, a movable conveyor which forms a transverse bottom of the hopper and extends outside the hopper and is movable in a given direction, means for driving the conveyor in said given direction, tuber distributing means for receiving the tubers from the conveyor and distributing the tubers one by one to the furrow to be sown, and regulating means for restricting the supply of tubers from the conveyor to the distributing means to solely one tuber at a time, the regulating means comprising a rotary structure mounted above the conveyor and defining with the conveyor a gap which is capable of allowing the passage of only one row of tubers, means for driving the periphery of the rotary structure adjacent the conveyor in a direction opposed to the direction of movement of the conveyor, a fork-shaped collector cup mounted at an end of the conveyor for receiving only one tuber from the conveyor at a time, means responsive to the presence of said one tuber in the cup and operative for stopping the movement of the conveyor when said one tuber is in the cup and allowing the movement of the conveyor when the collector cup is empty, the distributing means comprising movable cups for respectively passing through the fork-shaped collector cup and taking up a tuber received in the collector cup and depositing the tuber into the furrow, and means for driving the movable cups, the rotary structure comprising a wheel which has retractable vanes defining said gap with the conveyor, said gap being capable of allowing the passage of only one tuber at a time between the conveyor and the vanes.

14. A planting machine as claimed in claim 13, comprising radial slots in the wheel in which slots the vanes are slidable, pins on the vanes, side walls fixed on each side of the wheel and each defining an eccentric groove, the pins being cooperable with the grooves.

* * * * *